(12) United States Patent
Frenkel

(10) Patent No.: US 8,857,826 B2
(45) Date of Patent: Oct. 14, 2014

(54) WHEELBARROW LATERAL SUPPORT

(71) Applicant: Truper, SA DE CV, Jilotepec (MX)

(72) Inventor: Moises Sheinberg Frenkel, Delegacion Miguel Hidalgo (MX)

(73) Assignee: Truper, SA DE CV, Jilotepec (MX)

( * ) Notice: Subject to any disclaimer, the term of this patent is extended or adjusted under 35 U.S.C. 154(b) by 0 days.

(21) Appl. No.: 13/901,096

(22) Filed: May 23, 2013

(65) Prior Publication Data

US 2014/0091540 A1    Apr. 3, 2014

(30) Foreign Application Priority Data

Oct. 3, 2012  (MX) .................. MX/u/2012/000435

(51) Int. Cl.
*B62B 1/18*    (2006.01)
*B62B 5/00*    (2006.01)

(52) U.S. Cl.
CPC ..... *B62B 5/00* (2013.01); *B62B 1/18* (2013.01)
USPC ................................... 280/47.32; 280/47.33

(58) Field of Classification Search
USPC ................................ 802/47.32, 47.31, 47.33
See application file for complete search history.

(56) References Cited

U.S. PATENT DOCUMENTS

| 2,253,288 | A |   | 8/1941 | Lucchi |
| 2,532,966 | A |   | 12/1950 | Thomas |
| 2,692,175 | A |   | 10/1954 | Jacques |
| 3,282,600 | A | * | 11/1966 | Tonelli .................... 280/47.31 |
| 3,604,753 | A |   | 9/1971 | Couture |
| 4,208,044 | A |   | 6/1980 | Schoenfeld |
| 4,431,211 | A |   | 2/1984 | Carrigan |
| 5,465,801 | A |   | 11/1995 | Hoover |
| 5,580,018 | A |   | 12/1996 | Remmers |
| D404,881 | S | * | 1/1999 | Shuchart et al. ............... D34/27 |
| D404,882 | S | * | 1/1999 | Shuchart et al. ............... D34/27 |
| D404,883 | S | * | 1/1999 | Shuchart et al. ............... D34/27 |
| D408,607 | S | * | 4/1999 | Shuchart et al. ............... D34/27 |
| D408,955 | S | * | 4/1999 | Shuchart et al. ............... D34/27 |
| 6,241,276 | B1 | * | 6/2001 | Wilburn ........................ 280/659 |
| 6,554,301 | B2 | * | 4/2003 | Scott et al. .................. 280/47.31 |
| D487,833 | S | * | 3/2004 | Parker ............................. D34/27 |
| 6,820,880 | B2 |   | 11/2004 | Benton et al. |
| D501,974 | S |   | 2/2005 | Lawson et al. |
| 6,886,838 | B1 | * | 5/2005 | Zimmerman ............... 280/47.31 |
| 7,000,929 | B1 | * | 2/2006 | Liu .............................. 280/47.31 |

(Continued)

FOREIGN PATENT DOCUMENTS

| FR | 2620588 A1 | 3/1989 |
| GB | 2341160 A | 3/2000 |
| MX | 1796 | 5/2008 |

OTHER PUBLICATIONS

Prosecution history of corresponding U.S. Patent No. 7748723 including: Notice of Allowance dated Mar. 8, 2010; Amendment dated Dec. 9, 2009; Office Action dated Jun. 10, 2009.

*Primary Examiner* — Jeffrey J Restifo
(74) *Attorney, Agent, or Firm* — Westman, Champlin & Koehler, P.A.; Donika P. Pentcheva

(57) ABSTRACT

Embodiments of the present disclosure are directed to a wheelbarrow having a wheelbarrow lateral support. The wheelbarrow lateral support includes a first arm, a second arm, and a horizontal support area configured to connect the first arm and the second arm. The wheelbarrow lateral support further includes a first extension of subjection connected to the first arm.

16 Claims, 4 Drawing Sheets

(56) References Cited

U.S. PATENT DOCUMENTS

| | | |
|---|---|---|
| D530,879 S * | 10/2006 | Iturbide Jimenez et al. ... D34/27 |
| 7,232,135 B2 * | 6/2007 | Robinson .................... 280/47.31 |
| 7,258,231 B1 | 8/2007 | Wertz et al. |
| 7,296,807 B2 * | 11/2007 | Zimmerman ............... 280/47.32 |
| D588,323 S * | 3/2009 | Zimmerman .................. D34/27 |
| 7,506,878 B2 | 3/2009 | Feick |
| D591,022 S | 4/2009 | Zimmerman |
| D591,023 S | 4/2009 | Zimmerman |
| 7,748,723 B2 * | 7/2010 | Iturbide Jimenez ....... 280/47.31 |
| 7,775,531 B2 * | 8/2010 | Zimmerman .............. 280/47.31 |
| 7,866,686 B2 * | 1/2011 | Conaway et al. ............. 280/653 |
| 7,900,939 B2 * | 3/2011 | Robinson .................... 280/47.31 |
| 8,523,198 B2 * | 9/2013 | Albert et al. ................ 280/47.31 |
| 8,567,797 B2 * | 10/2013 | Westphal ................... 280/47.31 |
| 2005/0104334 A1 * | 5/2005 | Conaway et al. ............. 280/653 |
| 2007/0257456 A1 * | 11/2007 | Feick ......................... 280/47.31 |
| 2008/0246240 A1 * | 10/2008 | Iturbide Jimenez ....... 280/47.31 |
| 2008/0265537 A1 | 10/2008 | Lin |
| 2012/0319370 A1 * | 12/2012 | Westphal ................... 280/47.31 |
| 2012/0326407 A1 * | 12/2012 | Albert et al. ................ 280/47.31 |
| 2013/0313796 A1 * | 11/2013 | Albert et al. ................ 280/47.31 |
| 2014/0091540 A1 * | 4/2014 | Frenkel ...................... 280/47.31 |

* cited by examiner

WHEELBARROW LATERAL SUPPORT

BACKGROUND

The discussion below is merely provided for general background information and is not intended to be used as an aid in determining the scope of the claimed subject matter.

Wheelbarrows have existed for centuries. Therefore, wheelbarrow supports are known since such supports are normally integral parts of wheelbarrows. In general, a support must be configured so that during movement of the wheelbarrow, said support remains in raised position to avoid friction or obstructions with any type of floor and allow the wheelbarrow to advance unencumbered. However, the support must be configured so that during a resting position of the wheelbarrow, said support provides support between the wheelbarrow and the floor.

Currently there are several designs of wheelbarrows, and all of them have different structural features. Within this diversity of wheelbarrows, some designs include modifications of the lateral support component of the wheelbarrow. Due to the fact that wheelbarrow supports transmit a weight of a load to the floor, these components must have proper structural resistance to carry the load. On the other hand, there is the desire to lighten the weight of the components of the wheelbarrow in order to facilitate easier use of the wheelbarrow. In this sense the supports of the wheelbarrows also should be lightweight.

Currently there are wheelbarrows that have pins or lateral supports which are manufactured from a lightweight flat slab. With use, these types of supports begin to bend because there is a fatigue failure due to a lack of resistance to the continuous loading that wheelbarrows generally undergo.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

An aspect of the present disclosure is a wheelbarrow having a wheelbarrow lateral support that handles greater structural resistance during compression loads generated between the load carried by the wheelbarrow and the floor.

A further aspect of the present disclosure is a wheelbarrow lateral support for use with a wheelbarrow having a frame. The wheelbarrow lateral support comprises a first arm having an upper and a lower end, a second arm having an upper and a lower end, and a horizontal support area configured to connect the lower end of the first arm to the lower end of the second arm. The wheelbarrow lateral support further comprises a first extension of subjection connected to the upper end of the first arm and configured to remain parallel to the frame, the first extension of subjection comprising a horizontal extension element having an inwardly facing surface defining an angle ($\alpha 1$) with an inwardly facing surface of a first lateral portion and an angle ($\beta 1$) with an inwardly facing surface of a first fold portion. The first fold portion comprises a first planar portion configured to project onto at least one of the inwardly facing surface of the first lateral portion, an inwardly surface forming the angle ($\alpha 1$), the inwardly facing surface of the horizontal extension element, and an inwardly surface forming the angle ($\alpha 2$). The second fold portion comprises a second planar portion configured to project onto at least one of the inwardly facing surface of the second lateral portion, an inwardly surface forming the angle ($\alpha 2$), the inwardly facing surface of the horizontal extension element, and an inwardly surface forming the angle ($\alpha 1$).

This invention refers generally to wheelbarrows and, more specifically, to components of a loading wheelbarrow support. In particular, this invention includes a wheelbarrow lateral support that provides novel advantages over supports of the prior art. Some of those advantages include: improved load distribution which helps with maintaining proper balance while also reinforcing a leg of the wheelbarrow; improved resistance of components of the wheelbarrow; load distribution that supports repeated, alternating and fluctuating loads without loss of basic geometry; load distribution that works under shock absorbing conditions in order to avoid permanent deformation of components of the wheelbarrow.

BRIEF DESCRIPTION OF THE DRAWINGS

To provide a better understanding of aspects of the invention herein is attached the following drawings.

DETAILED DESCRIPTION OF ILLUSTRATIVE EMBODIMENTS

Figure 1:
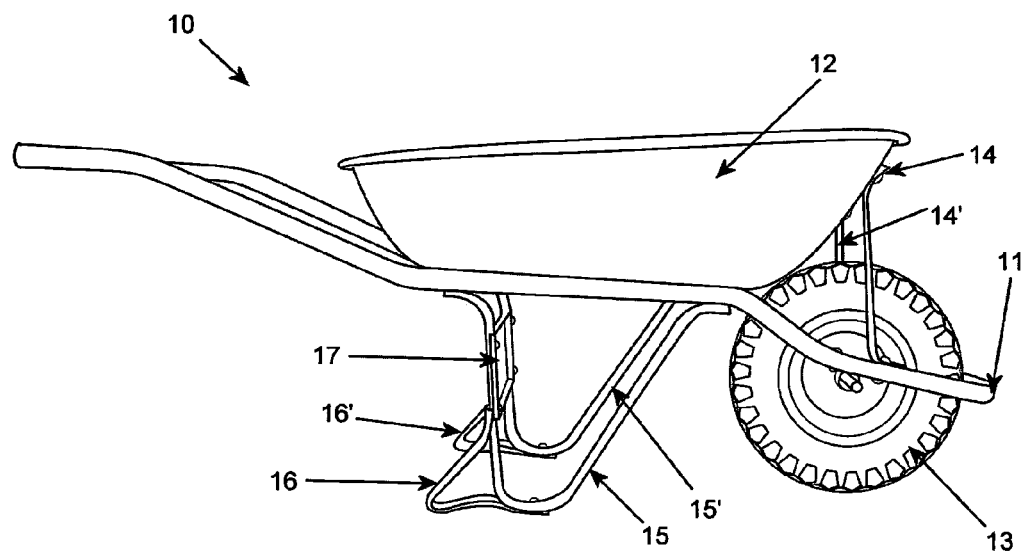
FIG. 1 is a lateral view of an assembly of a wheelbarrow with a wheelbarrow lateral support component.

Illustrative embodiments of the present disclosure are directed to a wheelbarrow having a wheelbarrow lateral support. As illustrated in FIG. 1, a wheelbarrow (10) includes a frame (11), a load tray (12), a wheel (13), at least two columns tray frames (14, 14'), at least two wheelbarrow lateral supports (15, 15'), at least two wheelbarrow stabilizers (16, 16'), and a binding plate (17) extending between the wheelbarrow lateral supports (15, 15').

Figure 2A:
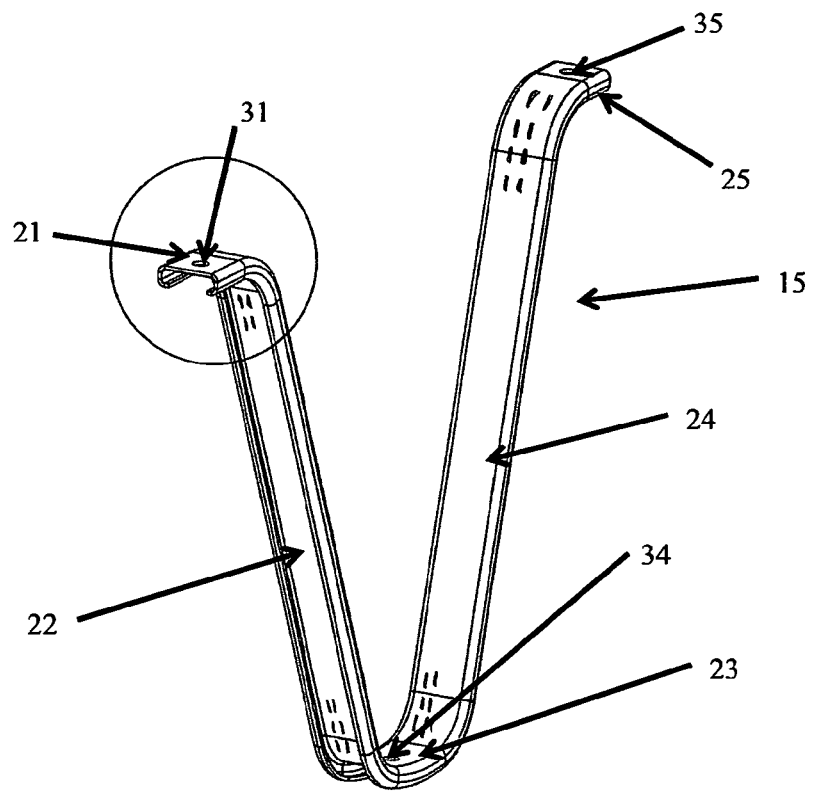
FIG. 2A is a perspective view of a first embodiment of the wheelbarrow lateral support.
Figure 2B:
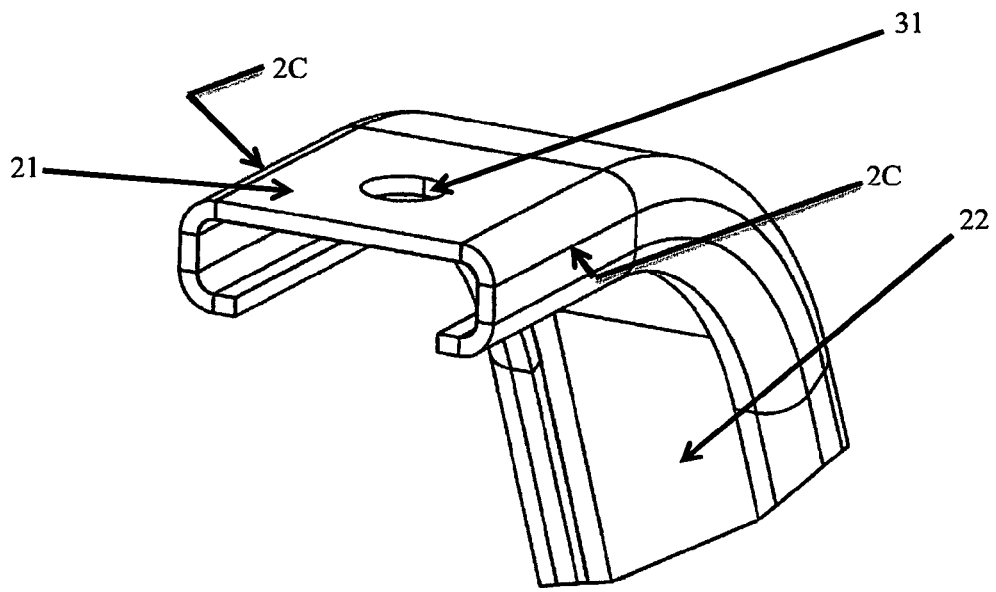
FIG. 2B is a detailed view of the first embodiment of the wheelbarrow lateral support of FIG. 2A.
Figure 2C:
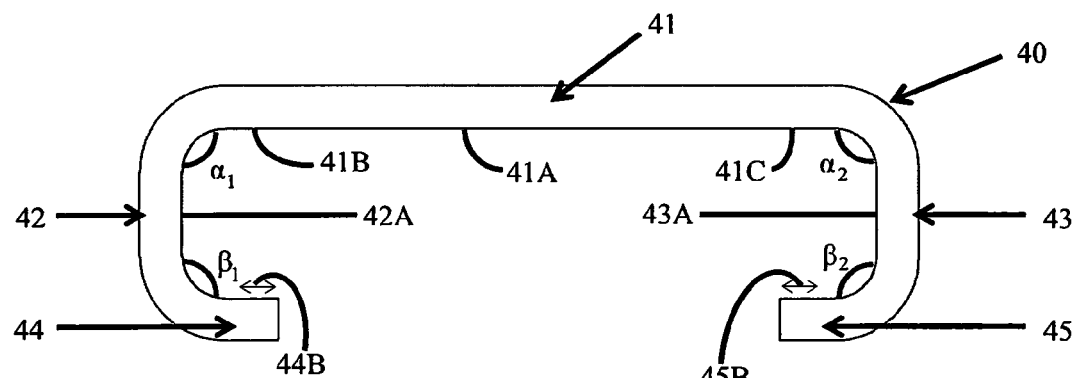
FIG. 2C is a cross-sectional view of the first embodiment of the wheelbarrow lateral support of FIG. 2A.

In accordance with a first exemplary embodiment of the present disclosure, FIGS. 2A to 2C illustrate wheelbarrow lateral supports (15, 15'). Lateral support (15) includes connected elements comprising a first extension of subjection (21), a first arm (22), a horizontal support area (23), a second arm (24), and a second extension of subjection (25). In the illustrated embodiment, the overall position of the first extension of subjection (21), the first arm (22), the horizontal support area (23), the second arm (24) and the second extension of subjection (25) is such that, as a whole, the profile of the lateral support (15) resembles an inverted "U" shape with folded upper portions. Further, it should be noted that the profile of the wheelbarrow lateral support (15) is continuous throughout and along all elements thereof, where the disclosed elements can have shapes and features described herein in more detail as follows.

In a first embodiment shown in FIGS. 2A-2C, the first extension of subjection (21) includes a bore (31) (best seen in FIG. 2B) configured to allow for coupling and securing the lateral support (15) to the frame (11) of the wheelbarrow (10). The coupling and securing of the lateral support (15) to the frame (11) can be done, for example, by way of a suitable fastener (not illustrated) but known to those skilled in the art, such as a bolt and nut fastener. Similarly, the second extension of subjection (25) can include a bore (35) (best seen in FIG. 2A) configured to allow for coupling the lateral support (15) to the frame (11) of the wheelbarrow (10). As further shown in the illustrative embodiments, the horizontal support area (23) can include a bore (34) (best seen in FIG. 2A) configured to allow for coupling the lateral support (15) to the stabilizer (16) (shown in FIG. 1) having a suitable fastener like a bolt and nut fastener.

In one embodiment, the first arm (22) of the lateral support (15) can have coupling means (not illustrated) known to those skilled in the art and configured to allow for the coupling of lateral support (15) to the binding plate (17) shown in FIG. 1. Likewise, the first arm (22) may have bores (not illustrated) which allow coupling of the lateral support (15) to the stabilizer (16) also shown in FIG. 1. In an exemplary embodiment, a junction between the first arm (22) and the horizontal support area (23) and a junction between the horizontal support area (23) and the second arm (24) can be formed and can include reinforcement folds known in the art and schematically illustrated at FIG. 2A. In a further exemplary embodiment, a junction between the first arm (22) and the first extension of subjection (21) and a junction between the second extensions of subjection (25) and the second arm (24) can be formed and can similarly include reinforcement folds schematically illustrated at FIG. 2A. In one embodiment, first arm (22) and second arm (24) can include one or more bends (illustrated by dashed lines in FIG. 2A) that would provide additional reinforcement and strength to arms (22, 24).

FIG. 2C shows a cross-section (40) taken along line 2C-2C of the first extension of subjection (21). The cross-section (40) is made by a horizontal extension element (41), a first lateral portion (42) that continues until forming a first fold portion (44), and a second lateral portion (43) that continues until forming a second fold portion (45). Both fold portions (44, 45) are bended and face one other. In an exemplary embodiment, cross-section (40) has a constant thickness. However, the thickness of cross-section (40) can vary in order to provide the proper load distribution and resistance of components of the wheelbarrow. The horizontal extension element (41), lateral portions (42, 43), and fold portions (44, 45) are integral being formed from a single unitary body. In the embodiment illustrated in FIG. 2C, horizontal extension element (41) is configured so as to remain parallel with respect to frame (11). The first lateral portion (42) and the second lateral portion (43) extend at specified angles with respect to the horizontal extension element (41). In particular, an inwardly facing surface (41A) of the horizontal extension element (41) defines an angle ($\alpha 1$) with an inwardly facing surface (42A) of the first lateral portion (42). Moreover, the inwardly facing surface (41A) of the horizontal extension element (41) defines an angle ($\alpha 2$) with an inwardly facing surface (43A) of the second lateral portion (43). The first fold portion (44) is joined to the first lateral portion (42) so as to form an angle ($\beta 1$), where the inwardly facing surface (42A) of the first lateral portion (42) defines the angle ($\beta 1$) with the inwardly facing surface (44A) of the first fold portion (44) and the inwardly facing surface (43A) of the second lateral portion (43) defines an angle ($\beta 2$) with the inwardly facing surface (45A) of the second fold portion (45). The inwardly facing surface (44A) of the first fold portion (44) includes a planar portion, shown by a double arrow (44B) in FIG. 2C, where the planar portion (44B) is projected onto an inwardly directed surface (41B) of the inwardly facing portion (41A) of the horizontal extension element (41), an example of such being illustrated in FIG. 2C. Similarly, the inwardly facing surface (45A) of the second fold portion (45) includes a planar portion, shown by a double arrow (45B) in FIG. 2C, where the planar portion (45B) is projected onto an inwardly directed surface (41C) of the inwardly facing portion (41A) of the horizontal extension element (41), an example of which is illustrated in FIG. 2C. Of course, the width of the projection may vary, particularly along the inwardly facing surface (41A) of the horizontal extension element (41), given the value of angle ($\beta 1$) or ($\beta 2$).

In other words, the first fold portion (44) can be configured such that the planar portion (44B) is projected onto at least one of the inwardly facing surface (42A) of the first lateral portion (42), the inwardly surface forming the angle ($\alpha 1$), the inwardly facing surface (41A) of the horizontal extension element (41), and the inwardly surface forming the angle ($\alpha 2$). Similarly, the second fold portion (45) can be configured such that the planar portion (45B) is projected onto at least one of the inwardly facing surface (43A) of the second lateral portion (43), the inwardly surface forming the angle ($\alpha 2$), the horizontal extension element (41), and the inwardly surface forming the angle ($\alpha 1$). In the exemplary embodiment shown in FIG. 2C, the two angles ($\alpha 1$) and ($\alpha 2$) are of the same degree. However, in alternative embodiments, the two angles ($\alpha 1$) and ($\alpha 2$) can be of different degrees. Likewise, angles ($\beta 1$) and ($\beta 2$) can be of the same degree or can be of different degrees.

In an exemplary embodiment, such as the one illustrated in FIG. 2C, profile of cross-section (40) is symmetrical and can substantially resemble the shape of an inverted letter "U" where the upper ends of the letter "U" are inwardly directed so that the inwardly facing surface of the fold portion (44) faces at least one of the inwardly facing surface of the horizontal extension element (41) or the inwardly facing surface of the first lateral portion (42), as described below (that is, folded partially toward one another where the angle ($\beta$) is between 90 and 180 degrees). It should be noted that in a second exemplary embodiment described in further detail below, the angle can be less than 90 degrees. The inwardly facing surface of the folded portion substantially once faces the inwardly facing surface of the lateral portion (42).

Figure 3A:
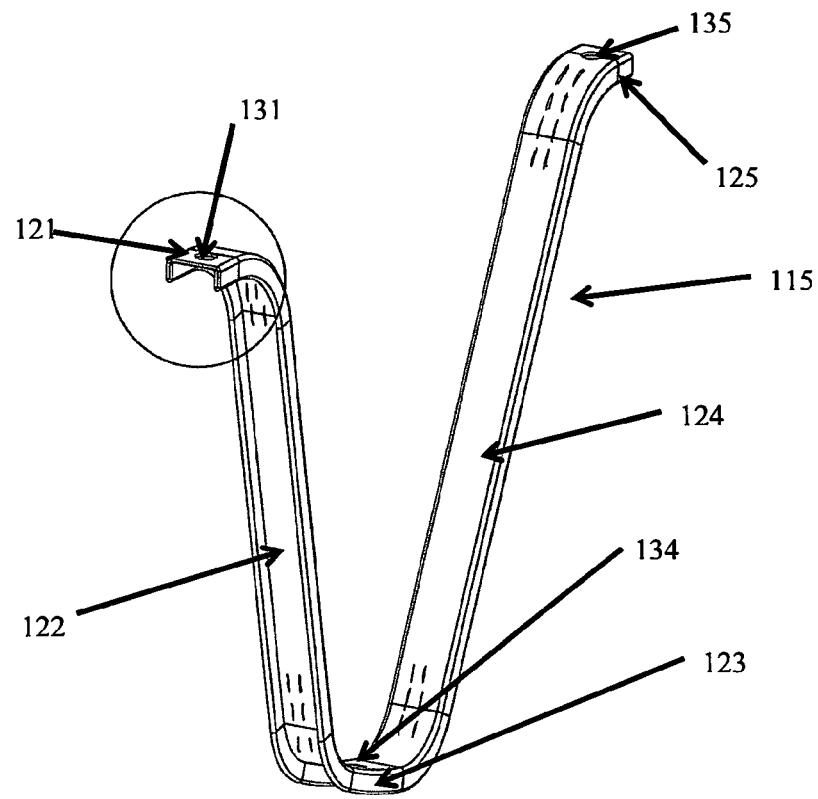
FIG. 3A is a perspective view of a second embodiment of the wheelbarrow lateral support.
Figure 3B:
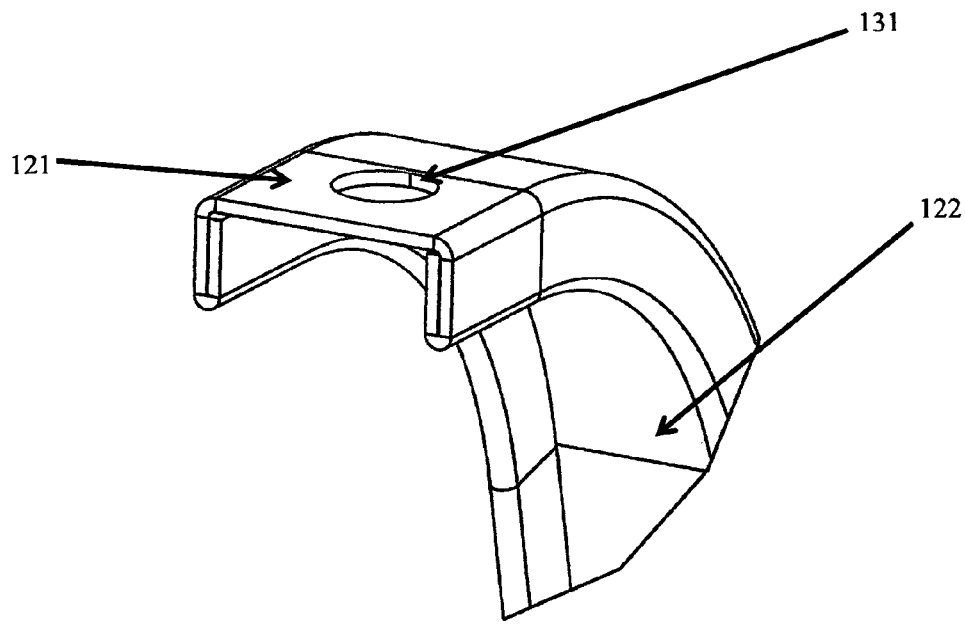
FIG. 3B is a detailed view of the second embodiment of the wheelbarrow lateral support of FIG. 3A.
Figure 3C:
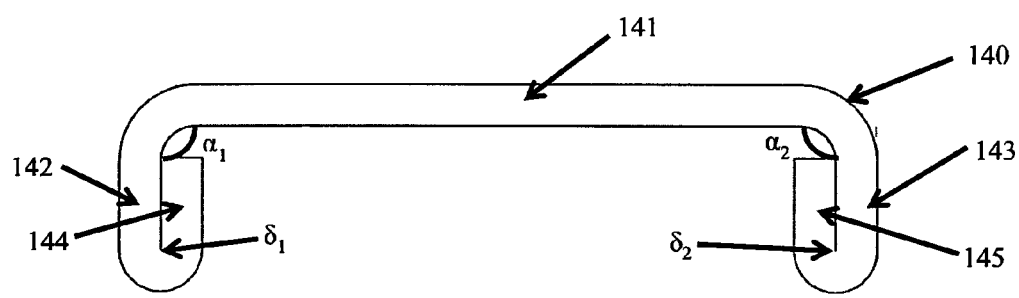
FIG. 3C is a view in the cross-section of the second embodiment of the wheelbarrow lateral support of FIG. 3A.

As illustrated in FIGS. 3A to 3C, a wheelbarrow lateral support (115) according to a second exemplary embodiment of the present disclosure is shown. As with the first exemplary embodiment of the invention, lateral support (115) is made by different connected portions (typically integral being formed from a single unitary body): a first extension of subjection (121), a first arm (122), a horizontal support area (123), a second arm (124) and a second extension of subjection (125). As a whole, the position of these portions is such that the lateral support (115) can substantially resemble the shape of an inverted letter "U," where the upper ends of the letter "U" are inwardly-directed (in other words, folded partially toward one another). The profile of the wheelbarrow lateral support (115) is continuous along all the portions which can have the shapes and features that were described in prior paragraphs above. In one embodiment, first arm (122) and second arm (124) can include one or more bends (illustrated by dashed lines in FIG. 3A) that would provide additional reinforcement and strength to arms (22, 24).

In the second exemplary embodiment, the overall shape of the lateral support (115) is generally equivalent to the shape of the lateral support (15) first embodiment. But in the second exemplary embodiment the first extension of subjection (121)

has a bore (131), best seen in FIG. 3B, which allows the lateral support (115) to couple to the frame (11) of the wheelbarrow (10). The bore (31) can be configured to receive any type of a suitable fastening mechanism (32) that will secure the lateral support (115) to the frame (11), as described above with respect to the first exemplary embodiment. Additionally, the horizontal support area (123) has a bore (134), best seen in FIG. 3A, which allows the coupling of the lateral support (115) to the stabilizer (16). Moreover, the second extension of subjection (125) can have a bore (135), best seen in FIG. 3A, that allows for coupling of lateral support (115) to the frame (11) of the wheelbarrow (10).

In a further exemplary embodiment, the first arm (122) of the lateral support (15) can have coupling means (not illustrated) known to those skilled in the art and configured to allow the coupling of lateral support (115) to the binding plate (17) shown in FIG. 1. Likewise, the first arm (122) may have bores (not illustrated) which allow coupling of the lateral support (115) to the stabilizer (16) also shown in FIG. 1. In an exemplary embodiment, a junction between the first arm (122) and the horizontal support area (123) and a junction between the horizontal support area (123) and the second arm (124) can be formed and can include reinforcement folds known in the art and schematically illustrated at FIG. 3A. In a further exemplary embodiment, a junction between the first arm (122) and the first extension of subjection (121) and a junction between second extension of subjection (125) and the second arm (124) can be formed and can similarly include reinforcement folds schematically illustrated at FIG. 3A. In one embodiment, first arm (122) and second arm (124) can include one or more bends (illustrated by dashed lines in FIG. 3A) that would provide additional reinforcement and strength to arms (122, 124).

FIG. 3C shows a cross-section (140) taken along line 3C-3C of the first extension of subjection (121) according to the second exemplary embodiment. Similar to the first exemplary embodiment, the cross-section (140) is made by a horizontal extension element (141), a first lateral portion (142) that continues until forming a first fold portion (144), and a second lateral portion (143) that continues until forming a second fold portion (145). Both fold portions (144, 145) are bended. In an exemplary embodiment, cross-section (140) has a constant thickness. However, the thickness of cross-section (40) can vary in order to provide the proper load distribution and resistance of components of the wheelbarrow. The horizontal extension element (141), lateral portions (142, 143), and fold portions (144, 145) are integral being formed from a single unitary body. In the embodiment illustrated in FIG. 3C, horizontal extension element (141) is configured so as to remain parallel with respect to the frame (11). The first lateral portion (142) and the second lateral portion (143) extend at specified angles with respect to the horizontal extension element (141). In particular, an inwardly facing surface (141A) of the horizontal extension element (141) defines an angle ($\alpha 1$) with an inwardly facing surface (142A) of the first lateral portion (142). Moreover, the inwardly facing surface (141A) of the horizontal extension element (141) defines an angle ($\alpha 2$) with an inwardly facing surface (143A) of the second lateral portion (143). In the exemplary embodiment, the planar portion (44B) is projected only upon the inwardly directed surface (42A) of the first lateral portion (42) and the planar portion (45B) is projected only upon the inwardly facing surface (43A) of the second lateral portion (43). In other words, the first fold portion (144) is joined to the first lateral portion (142) so as to form an angle (61), where the inwardly facing surface (142A) of the first lateral portion (142) defines the angle (61) with the inwardly facing surface (144A) of the first fold portion (144) and the inwardly facing surface (143A) of the second lateral portion (143) defines an angle (62) with the inwardly facing surface (145A) of the second fold portion (145). In an exemplary embodiment, such as the one illustrated in FIG. 3C, profile of cross-section (140) is symmetrical and can substantially resemble the shape of an inverted letter "U" where the upper ends of the letter "U" are folded partially toward one another. In the second exemplary embodiment, first and second fold portions (144, 145) are inwardly directed toward one another such that the angle ($\delta$) is approximately 0 degrees, but remains practically parallel to the corresponding first and second lateral portions (142, 143).

In both exemplary embodiments discussed herein, the wheelbarrow lateral support (15, 115) can be manufactured with profiled sheet according to the profiles described above. Moreover, it should be noted that further embodiments of the present invention includes within its scope all variations existing of lateral support profile that may be between the first embodiment with the angle ($\beta$) and the second embodiment with the angle ($\delta$).

For example, the material used to form the profiled sheet can be steel sheet having caliber 14 (1.9 mm) in one embodiment, or caliber 16 (1.5 mm) in another embodiment. Additionally, the wheelbarrow lateral support (15, 115) may be manufactured by a simplified, low-cost process that has three steps which include sheet punching press, profile folding described in press and final classification of the press support.

As described above, the wheelbarrow lateral support (15, 115) allows the wheelbarrow (10) to support a greater load without compromising the structural stiffness of the elements of the wheelbarrow (10). The profiles of cross-sections (40, 140) described above allow the wheelbarrow lateral support (15, 115) to exhibit a greater inertial motion and a greater turning radius than the known supports (shown in Table 1). The above means that the loads received by each one of the lateral supports (15, 115) that make the wheelbarrow (10) during the resting position, the positions of the wheelbarrow lateral supports (15, 115) will resist higher torques. This means that there will have greater resistance by inhibiting kinks derived from the impacts executed along the life thereof. The above also provokes a decrease of the thickness of the wheelbarrow lateral supports (15, 115) of this invention allowing material saving and weight reduction, as can be proved hereinafter.

However, in order to provide greater support to the advantages provided to the wheelbarrow lateral support (15, 115), included herein are tables showing comparisons of the bending stress that will happen in the area of the wheelbarrow lateral support, as well as the normal stress that happens in the leg of the contact area with the floor between an inverted "U" profile (as described, for example, in U.S. Patent Application No. 2007/0257456), and two profiles proposed in the object embodiments of this invention:

TABLE 1

| Bending Stress | $\sigma_{f1} = \frac{12M}{BH^2}$ | Prior Art $\sigma_{f2} = 1.81(\sigma_{f1})$ | Embodiment 1 $\sigma_{f4} = 1.37(\sigma_{f1})$ | Embodiment 2 $\sigma_{f3} = 1.42(\sigma_{f1})$ |
|---|---|---|---|---|

Wherein B is the base, H is the height of the profile, and M is the bending moment.

From the Table 1, it can be seen that the bending stress is lower for the configurations set forth in the two exemplary embodiments described herein. Because a bending stress implies a higher risk of breakdown or failure, the exemplary embodiments illustrated present a better mechanical resistance than the profile of an inverted "U" which is described in the prior art, such as in U.S. Patent Application Serial No. 2007/0257456.

It should be noted that calculations and impact tests using various parameters for the base, height and bending moment were performed. The impact tests compared the profile of a wheelbarrow lateral support having an inverted "U" with no folded portions (as described in the prior art) with the profile of the second exemplary embodiment. The impact test utilizes a stepped ramp wherein each step has a height of 6 inches (15.24 cm). The first step includes raising the wheelbarrow ramp. The second step includes raising the wheelbarrow 17 cm measured from the floor to the lateral support and move it to the following step. In the third step the wheelbarrow is released to produce a first impact. Fourth step consists of raising the wheelbarrow 17 cm measured from the floor to the lateral support and moving it to the following step. In the fifth step the wheelbarrow is released to produce a second impact.

Table 2 presents the results gathered from an first impact test that used a wheelbarrow with a wood frame, having a heaping load of 160 Kg. where the deformation was measured from the height of the lateral support to the floor.

TABLE 2

Impact Test in Wheelbarrow with Wood Frame

| Lateral Support | Caliber | Impacts | Deformation (cm) |
| --- | --- | --- | --- |
| Prior Art | 12 | 150 | 1.5 |
| 2° Embodiment | 14 | 150 | 1.4 |

Table 3 presents the results gathered in the second impact test of a wheelbarrow with a tubular frame, with a heaping 160 Kg load. This impact test measured the deformation of the height from the lateral support and the floor.

TABLE 3

Impact Test in Wheelbarrow with Tubular Frame

| Lateral Support | Caliber | Impacts | Deformation (cm) |
| --- | --- | --- | --- |
| Prior Art | 12 | 60 | 6.8 |
| 2° Embodiment | 14 | 60 | 6.6 |

Table 4 presents the results gathered in the third impact test of a light wheelbarrow, with a heaping 66 Kg load. This impact test measured the deformation of the height from the lateral support and the floor.

TABLE 4

Impact Test in Lightweight Wheelbarrow

| Lateral Support | Caliber | Impacts | Deformation (cm) |
| --- | --- | --- | --- |
| Prior Art | 14 | 60 | 6.8 |
| 2° Embodiment | 16 | 60 | 6.6 |

Within all the tests performed it may be observed how the lateral support (115) of the second exemplary embodiment herein described manufactured in a smaller size presented a minor deformation for the three types of wheelbarrows. Accordingly, the wheelbarrow lateral support resists a greater amount of impacts before a failure occurs.

Based on the previous revelation, certain embodiments and details have been described in order to illustrate this invention, and shall be evident for persons of ordinary skills in the art that may have variations and modifications without departing from the scope of this invention.

Although the subject matter has been described in a language specific to structural features and/or methodological acts, it is to be understood that the subject matter defined in the appended claims is not necessarily limited to the specific features or acts described above as has been determined by the courts. Rather, the specific features and acts described above are disclosed as example forms of implementing the claims.

The invention claimed is:

1. A wheelbarrow lateral support for use with a wheelbarrow having a frame, comprising:
 a first arm having an upper and a lower end;
 a second arm having an upper and a lower end;
 a horizontal support area configured to connect the lower end of the first arm to the lower end of the second arm; and
 a first extension of subjection connected to the upper end of the first arm and configured to remain parallel to the frame, the first extension of subjection comprising a horizontal extension element having an inwardly facing surface, where the inwardly facing surface of the horizontal extension element defining an angle ($\alpha 1$) with an inwardly facing surface of a first lateral portion, the inwardly facing surface of the first lateral portion further defining an angle ($\beta 1$) with an inwardly facing surface of a first fold portion, the inwardly facing surface of the horizontal extension element further defining an angle ($\alpha 2$) with an inwardly facing surface of a second lateral portion, the inwardly facing surface of the second lateral portion further defining an angle ($\beta 2$) with the inwardly facing portion of the second fold portion;
 wherein the first fold portion comprises a first planar portion configured to project onto at least one of the inwardly facing surface of the first lateral portion, an inwardly surface forming the angle ($\alpha 1$), the inwardly facing surface of the horizontal extension element, and an inwardly surface forming the angle ($\alpha 2$); and
 wherein the second fold portion comprises a second planar portion configured to project onto at least one of the inwardly facing surface of the second lateral portion, an inwardly surface forming the angle ($\alpha 2$), the inwardly facing surface of the horizontal extension element, and an inwardly surface forming the angle ($\alpha 1$).

2. The wheelbarrow lateral support of claim 1, wherein the planar portion of the first fold portion is configured to project onto at least one of the inwardly facing surface of the first lateral portion and the inwardly surface forming the angle ($\alpha 1$).

3. The wheelbarrow lateral support of claim 1, wherein the planar portion of the first fold portion is configured to project onto at least one of the inwardly surface forming the angle ($\alpha 1$) and the inwardly facing surface of the horizontal extension element.

4. The wheelbarrow lateral support of claim 1, wherein the planar portion of the first fold portion is configured to project onto at least one of the inwardly facing surface of the horizontal extension element and the inwardly surface forming the angle ($\alpha 2$).

5. The wheelbarrow lateral support of claim 1, wherein the first extension of subjection includes a bore configured to couple the lateral support to a frame of the wheelbarrow and wherein the second extension of subjection includes a bore configured to couple the lateral support to the frame of the wheelbarrow.

6. The wheelbarrow lateral support of claim 1, wherein the wheelbarrow lateral support comprises steel sheet having a caliber 14.

7. The wheelbarrow lateral support of claim 1, wherein the wheelbarrow lateral support comprises steel sheet having a caliber 16.

8. The wheelbarrow lateral support of claim 1, further comprising:
a second extension of subjection connected to the upper end of the first arm and configured to remain parallel to the frame, the second extension of subjection comprising a horizontal extension element having an inwardly facing surface, where the inwardly facing surface of the horizontal extension element defining an angle ($\alpha 1$) with an inwardly facing surface of a first lateral portion, the inwardly facing surface of the first lateral portion further defining an angle ($\beta 1$) with an inwardly facing surface of a first fold portion, the inwardly facing surface of the horizontal extension element further defining an angle ($\alpha 2$) with an inwardly facing surface of a second lateral portion, the inwardly facing surface of the second lateral portion further defining an angle ($\beta 2$) with the inwardly facing portion of the second fold portion;
wherein the first fold portion comprises a first planar portion configured to project onto at least one of the inwardly facing surface of the first lateral portion, an inwardly surface forming the angle ($\alpha 1$), the inwardly facing surface of the horizontal extension element, and an inwardly surface forming the angle ($\alpha 2$); and
wherein the second fold portion comprises a second planar portion configured to project onto at least one of the inwardly facing surface of the second lateral portion, an inwardly surface forming the angle ($\alpha 2$), the inwardly facing surface of the horizontal extension element, and an inwardly surface forming the angle ($\alpha 1$).

9. A wheelbarrow, comprising:
a load tray for carrying a load of materials;
a frame configured to receive the load tray;
at least two column tray frames extending between the load tray and the frame;
a wheelbarrow lateral support removably connected to the frame, the wheelbarrow lateral support comprising:
a horizontal support area configured to connect the lower end of the first arm to the lower end of the second arm; and
a first extension of subjection connected to the upper end of the first arm and configured to remain parallel to the frame, the first extension of subjection comprising a horizontal extension element having an inwardly facing surface, where the inwardly facing surface of the horizontal extension element defining an angle ($\alpha 1$) with an inwardly facing surface of a first lateral portion, the inwardly facing surface of the first lateral portion further defining an angle ($\beta 1$) with an inwardly facing surface of a first fold portion, the inwardly facing surface of the horizontal extension element further defining an angle ($\alpha 2$) with an inwardly facing surface of a second lateral portion, the inwardly facing surface of the second lateral portion further defining an angle ($\beta 2$) with the inwardly facing portion of the second fold portion;
wherein the first fold portion comprises a first planar portion configured to project onto at least one of the inwardly facing surface of the first lateral portion, an inwardly surface forming the angle ($\alpha 1$), the inwardly facing surface of the horizontal extension element, and an inwardly surface forming the angle ($\alpha 2$); and
wherein the second fold portion comprises a second planar portion configured to project onto at least one of the inwardly facing surface of the second lateral portion, an inwardly surface forming the angle ($\alpha 2$), the inwardly facing surface of the horizontal extension element, and an inwardly surface forming the angle ($\alpha 1$).

10. The wheelbarrow of claim 9, wherein the planar portion of the first fold portion is configured to project onto at least one of the inwardly facing surface of the first lateral portion and the inwardly surface forming the angle ($\alpha 1$).

11. The wheelbarrow of claim 9, wherein the planar portion of the first fold portion is configured to project onto at least one of the inwardly surface forming the angle ($\alpha 1$) and the inwardly facing surface of the horizontal extension element.

12. The wheelbarrow of claim 9, wherein the planar portion of the first fold portion is configured to project onto at least one of the inwardly facing surface of the horizontal extension element and the inwardly surface forming the angle ($\alpha 2$).

13. The wheelbarrow of claim 9, wherein the first extension of subjection includes a bore configured to couple the lateral support to a frame of the wheelbarrow and wherein the second extension of subjection includes a bore configured to couple the lateral support to the frame of the wheelbarrow.

14. The wheelbarrow of claim 9, wherein the wheelbarrow lateral support comprises steel sheet having a caliber 14.

15. The wheelbarrow lateral support of claim 9, wherein the wheelbarrow lateral support comprises steel sheet having a caliber 16.

16. The wheelbarrow of claim 9, further comprising:
a second extension of subjection connected to the upper end of the first arm and configured to remain parallel to the frame, the second extension of subjection comprising a horizontal extension element having an inwardly facing surface, where the inwardly facing surface of the horizontal extension element defining an angle ($\alpha 1$) with an inwardly facing surface of a first lateral portion, the inwardly facing surface of the first lateral portion further defining an angle ($\beta 1$) with an inwardly facing surface of a first fold portion, the inwardly facing surface of the horizontal extension element further defining an angle ($\alpha 2$) with an inwardly facing surface of a second lateral portion, the inwardly facing surface of the second lateral portion further defining an angle ($\beta 2$) with the inwardly facing portion of the second fold portion;
wherein the first fold portion comprises a first planar portion configured to project onto at least one of the inwardly facing surface of the first lateral portion, an inwardly surface forming the angle ($\alpha 1$), the inwardly facing surface of the horizontal extension element, and an inwardly surface forming the angle ($\alpha 2$); and
wherein the second fold portion comprises a second planar portion configured to project onto at least one of the inwardly facing surface of the second lateral portion, an inwardly surface forming the angle ($\alpha 2$), the inwardly facing surface of the horizontal extension element, and an inwardly surface forming the angle ($\alpha 1$).

* * * * *